(12) United States Patent
Parienti

(10) Patent No.: US 9,283,848 B2
(45) Date of Patent: Mar. 15, 2016

(54) FOLDABLE, ULTRA-LIGHTWEIGHT TRICYCLE HAVING AN ELECTRIC MOTOR

(76) Inventor: Raoul Parienti, Nice (FR)

( * ) Notice: Subject to any disclaimer, the term of this patent is extended or adjusted under 35 U.S.C. 154(b) by 0 days.

(21) Appl. No.: 14/130,938

(22) PCT Filed: Jul. 7, 2011

(86) PCT No.: PCT/FR2011/000400
§ 371 (c)(1),
(2), (4) Date: Jan. 6, 2014

(87) PCT Pub. No.: WO2012/004477
PCT Pub. Date: Jan. 12, 2012

(65) Prior Publication Data
US 2015/0158386 A1 Jun. 11, 2015

(51) Int. Cl.
| B60K 31/02 | (2006.01) |
| B62K 3/00 | (2006.01) |
| B62K 5/05 | (2013.01) |
| B62K 15/00 | (2006.01) |
| B62K 5/027 | (2013.01) |
| B60K 31/00 | (2006.01) |

(52) U.S. Cl.
CPC ................. *B60K 31/02* (2013.01); *B62K 3/002* (2013.01); *B62K 5/027* (2013.01); *B62K 5/05* (2013.01); *B62K 15/006* (2013.01); *B60K 2031/0091* (2013.01); *B62K 2202/00* (2013.01); *B62K 2204/00* (2013.01)

(58) Field of Classification Search
CPC ........ B62D 61/065; B62K 3/007; B62K 5/02; B62K 5/025; B62K 5/027; B62K 2202/00; B62K 3/002; B62K 5/05; B62K 15/006; B62K 2204/00; B60K 31/02; B60K 2031/0091
See application file for complete search history.

(56) References Cited

U.S. PATENT DOCUMENTS

| 4,087,106 A | * | 5/1978 | Winchell | 280/14.28 |
| 4,354,569 A | * | 10/1982 | Eichholz | 180/211 |
| 4,874,055 A | * | 10/1989 | Beer | 180/19.2 |

(Continued)

FOREIGN PATENT DOCUMENTS

| CN | 203854800 U | * 10/2014 | 280/87.041 |
| CN | 203888953 U | * 10/2014 | 280/87.041 |

(Continued)

*Primary Examiner* — Hau Phan
*Assistant Examiner* — Jacob Meyer
(74) *Attorney, Agent, or Firm* — James C. Lydon

(57) ABSTRACT

Ultralight tricycle with electric engine including a base frame (15) fitted with two front wheels and one driving back wheel (9), an electric engine propelling the driving wheel, and one steering wheel (3) including a steering wheel (4) maneuvered by the user in order to control the steering and/or speed of the tricycle, the tricycle being designed to switch from the unfolded configuration allowing the user positioned on the base frame to ride the tricycle into a folded configuration enabling the user to seize the steering wheel in order to have the tricycle rolling on its two front wheels while keeping the back wheel away from the ground. The tricycle includes a tachymeter that measures the speed of the tricycle and one slowing down/braking command unit connected to the tachymeter and suited to command the transformation of the engine into a generator of electric current provided to a battery when the speed of the engine exceeds a preset speed ranging between 20 km/h and 30 km/h so that the tricycle slows down as a result of the engine being turned into a generator acts as a brake.

10 Claims, 4 Drawing Sheets

(56) References Cited

U.S. PATENT DOCUMENTS

| | | | |
|---|---|---|---|
| 5,657,828 A * | 8/1997 | Nagamachi | 180/19.3 |
| 5,830,313 A * | 11/1998 | Smith | 156/763 |
| 6,302,230 B1 * | 10/2001 | Kamen et al. | 180/171 |
| 6,345,678 B1 * | 2/2002 | Chang | 180/181 |
| 6,367,817 B1 * | 4/2002 | Kamen et al. | 280/5.507 |
| 6,561,294 B1 * | 5/2003 | Kamen et al. | 180/21 |
| 6,651,766 B2 * | 11/2003 | Kamen et al. | 180/218 |
| 6,907,949 B1 * | 6/2005 | Wang | 180/65.51 |
| 7,004,271 B1 * | 2/2006 | Kamen et al. | 180/21 |
| 7,040,443 B1 * | 5/2006 | Roth et al. | 180/221 |
| 7,192,040 B2 * | 3/2007 | Xie | 280/93.502 |
| 7,273,116 B2 * | 9/2007 | Kamen et al. | 180/21 |
| 7,690,447 B2 * | 4/2010 | Kamen et al. | 180/21 |
| 7,810,591 B2 * | 10/2010 | Yamano | 180/65.1 |
| 7,845,443 B2 * | 12/2010 | Liberty et al. | 180/24.07 |
| 7,963,352 B2 * | 6/2011 | Alexander | 180/21 |
| 8,170,780 B2 * | 5/2012 | Field et al. | 701/124 |
| 8,464,822 B2 * | 6/2013 | Spector et al. | 180/219 |
| 8,500,147 B2 * | 8/2013 | Johnson | 280/87.05 |
| 8,695,999 B2 * | 4/2014 | Von Bismarck | 280/87.041 |
| 2002/0000339 A1 * | 1/2002 | Tsai | 180/65.1 |
| 2002/0063006 A1 * | 5/2002 | Kamen et al. | 180/171 |
| 2003/0029652 A1 * | 2/2003 | Lan | 180/65.2 |
| 2006/0054370 A1 * | 3/2006 | Sugioka et al. | 180/211 |
| 2006/0266570 A1 * | 11/2006 | Roth et al. | 180/208 |
| 2007/0158117 A1 * | 7/2007 | Alexander | 180/21 |
| 2009/0160150 A1 * | 6/2009 | Johnson | 280/87.041 |
| 2009/0255747 A1 * | 10/2009 | Kasaba et al. | 180/208 |
| 2010/0225085 A1 * | 9/2010 | Kim | 280/221 |
| 2012/0175179 A1 * | 7/2012 | Spector et al. | 180/219 |
| 2013/0056950 A1 * | 3/2013 | Von Bismarck | 280/269 |
| 2013/0175103 A1 * | 7/2013 | Flowers | 180/65.1 |
| 2013/0300080 A1 * | 11/2013 | Walther et al. | 280/87.041 |
| 2014/0090910 A1 * | 4/2014 | Treadway et al. | 180/65.51 |
| 2014/0265223 A1 * | 9/2014 | Ouboter | 280/266 |
| 2015/0035257 A1 * | 2/2015 | Zaid et al. | 280/641 |
| 2015/0068828 A1 * | 3/2015 | Delgatty et al. | 180/210 |
| 2015/0122566 A1 * | 5/2015 | Constein | 180/210 |

FOREIGN PATENT DOCUMENTS

| | | | |
|---|---|---|---|
| CN | 203921057 U * | 11/2014 | 280/87.041 |
| EP | 1 232 938 | 8/2002 | |
| GB | 2 466 241 | 6/2010 | |
| WO | WO 00/74622 | 12/2000 | |
| WO | WO 02/36419 | 5/2002 | |

* cited by examiner

FOLDABLE, ULTRA-LIGHTWEIGHT TRICYCLE HAVING AN ELECTRIC MOTOR

TECHNICAL DOMAIN

The present invention is related to a new mean of transportation that is ultralight, individual, well suited to easily move around city centers and, in particular, deals with an ultralight foldable tricycle with electric engine.

STATE OF THE ART

Jams in city centers, the increase of gas price and the increasing ecological awareness for the sustainability of the planet, give rise to new means of "clean" transportation.

The development of bicycles in cities and self service bicycles partly answer this request, however this mode of transportation has many flaws such as the possibility of theft and vandalism that are common when bikes are parked on the street. Moreover, your bicycle cannot always be carried with you and may not be carried into your workplace or home due to its size and weight. In addition, the motion speed is low and depends on the athletic capabilities of the user. Electric bicycle brings part of the solution on this last point, however its even heavier weight reduces its portability.

Moreover, riding a two wheel bicycle induces a high feeling of lack of safety and a high risk of falling. Everyone knows that slipping of the front wheel of a bike or locking wheels by heavy braking induces falling and injuries that may be severe.

Some tricycles with electric propulsion have been devised such as those described in documents EP 1630081, WO 00/74622 and WO 02/36419. These tricycles are heavy and bulky since they require a massive and thus heavy electric battery, and are not fitted with means that limit speed and thus the high weight of the device. As a consequence, it is almost impossible to put such a tricycle in a car trunk or in a lift in order to carry it to the location of use.

PRESENTATION OF THE INVENTION

The aim of the invention is a tricycle with electric engine where its speed is limited in order for the tricycle to be very light since its components are reduced in sizing and hence the tricycle may be easily carried to the location of use.

The aim of the invention is hence an ultralight tricycle with electric propulsion that includes a base frame fitted with 2 front wheels and one driving rear wheel, an electric engine to power the driving wheel, a battery to provide the electric power to the engine and a driving shaft that extends from the base frame and that includes a steering wheel configured so that the user can maneuver it to control direction and/or speed of the tricycle, the tricycle being designed in order to easily evolve from the unfolded configuration where the driving shaft is in a position almost perpendicular to the base frame and bound to the base frame so that the user positioned on the base frame can maneuver the steering wheel to drive the tricycle, to a folded configuration where the driving shaft is lowered towards the base frame so that the user may seize the steering wheel to have the tricycle to roll on its two front wheels while the rear wheel is kept away from the ground. The tricycle includes a tachymeter to measure the tricycle speed and a control unit for braking connected to the tachymeter and suited to command the transformation of the engine into a generator providing electricity to the battery when the engine speed exceeds a preset speed, for instance in the range 20 km/h to 30 km/h so that the tricycle slows down since the engine turned into a generator acts like a brake.

BRIEF DESCRIPTION OF THE DRAWINGS

The goals, aims and characteristics of the invention will become more clear when reading the description below with reference to the drawings where.

DETAILED DESCRIPTION OF THE INVENTION

The tricycle according to the invention may be either in a folded configuration in order to be carried, or in the unfolded configuration.

Figure 2:
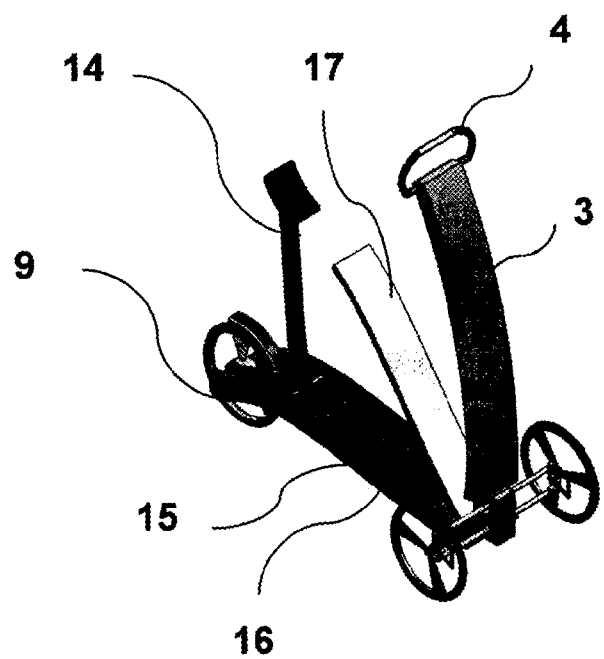
FIG. 2 represents the tricycle according to the invention in the unfolded configuration.

The tricycle in the unfolded configuration as illustrated on FIG. 2 is fitted with a steering wheel 4 which is bound to the steering shaft 3, the rotation of the steering wheel to the right or to the left induces the rotation of both front wheels in the same direction. As shown later, the steering wheel may be maneuvered through a front/rear rotation, (or vice versa) such a maneuver inducing the acceleration or the slowing down/braking.

The user has the possibility to ride the tricycle either sitting on the folding saddle 14, or standing up like on a child's scooter. The base frame 15 is fitted with an empty space 16 protected by a cover 17 the said empty space containing the foldable saddle 14 that may be instantaneously deployed or folded.

Figure 1:
FIG. 1 represents a person pulling the tricycle, according to the invention, in the folded configuration on its two front wheels, by pulling the steering wheel.

The tricycle may be set in the folded configuration as shown on FIG. 1 thanks to an articulation fitted with a lever that can associate or dissociate the steering shaft when rotating. Once folded, the tricycle may easily be carried by rolling it in a steady fashion on its two front wheels, the steering wheel being used as a handle that enables the user to move the tricycle without effort by rolling it on its two front wheels.

Figure 3:
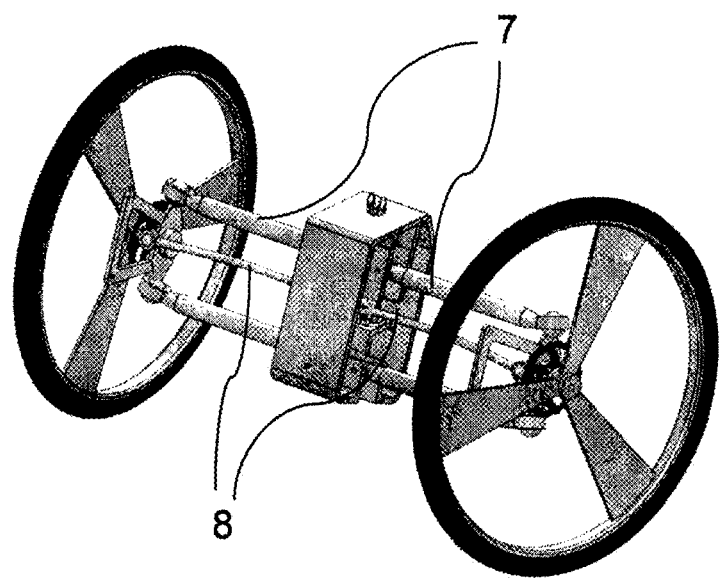
FIG. 3 represents the steering module with the two front wheels, two tilt shafts and the steering connecting rods.

As shown on FIG. 3, the steering shaft is linked to a steering module through an articulation. The steering module ensures the positioning and guidance of two tilt shafts 7 and the maneuver of the connecting rods 8.

Figure 5:
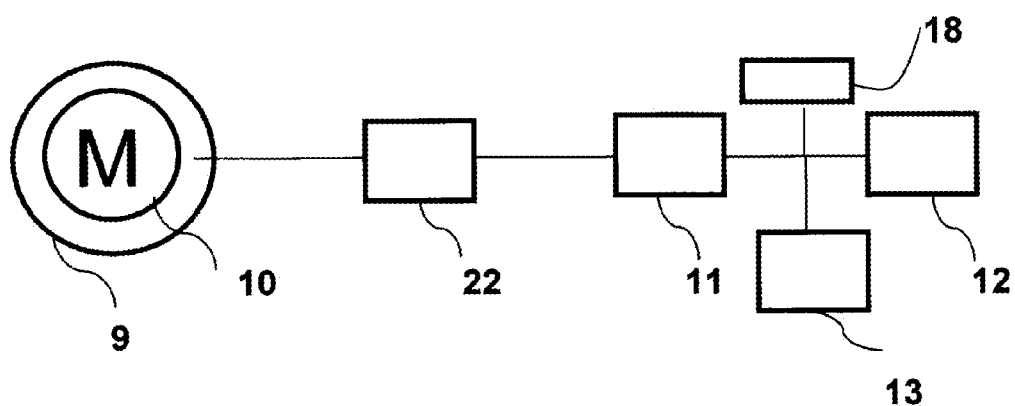
FIG. 5 is a block diagram of the electric propulsion part of the tricycle according to the invention.

As shown on the block diagram of FIG. 5, the rear wheel 9 includes in its hub an electric engine 10 of the brushless type with permanent magnets powered by one or several batteries 11. It has to be noted that the integration of an engine in the hub of the driving wheel avoids having to use a transmission mean such as a chain, a belt or an universal joint, allowing a significant weight and bulk reduction.

The command unit of the accelerator 12 regulates the power provided by the engine through a regulation unit 13, in order to provide the acceleration and speed of the tricycle.

Figure 4:
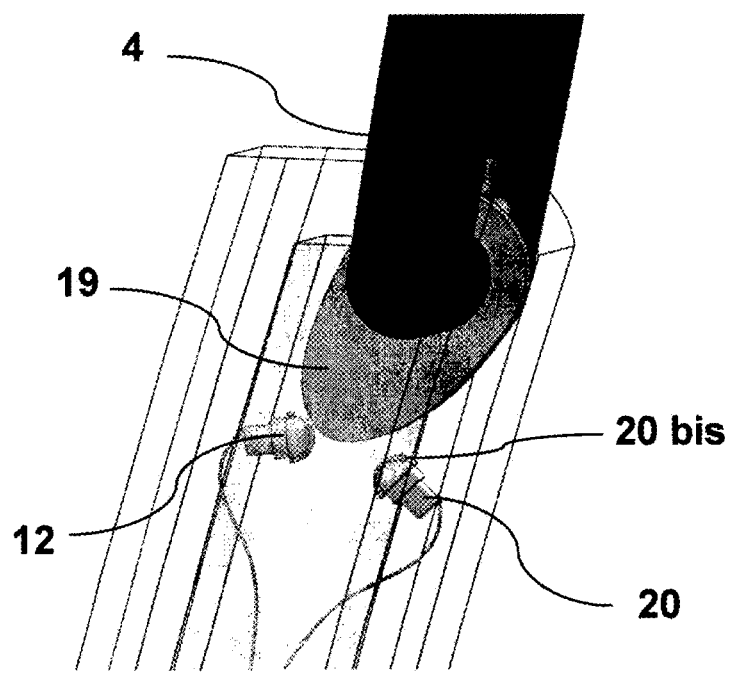
FIG. 4 is a representation of the cam bound to the steering wheel on the steering shaft.

As shown on FIG. 4, the front-rear maneuver of the steering wheel drives a cam 19 which is linked to it. The crank of the cam 19 drives progressively the acceleration command unit 12 when the steering wheel is maneuvered for instance forward, and drives a slowing down/braking command unit 20, 20bis when maneuvered backwards. A torsion shaft acts as a recalling spring, so that when not activated the steering wheel comes back to the neutral position, i.e. when acceleration and braking is not activated.

The motion backward (or forward) acts thanks to a cam on the slowing down command unit 20bis in order to slow down the tricycle, which induces the engine function to be turned into the generator function so that the kinetic energy of the tricycle is progressively turned into electric current, that slows down the tricycle and loads the battery. The current that is produced by the engine acting like a generator is rectified through an inverter-rectifier 22 in order to turn it into a direct current. Conversely, the inverter function enables the transformation of the direct current provided by the battery into alternating current powering the engine 10 integrated in the hub of the rear wheel.

The action of pulling the steering wheel backward towards you 4 induces braking and stopping of the tricycle through progressive action of the disk brakes mounted on each wheel.

The result of the action of the slowing down command unit is determining to the invention. Indeed, since kinetic energy increases as the square of speed, and if the tricycle is not equipped with an electric slowing down unit, then it can reach a very high speed when going downhill, that would imply that it would be designed with heavy mechanical structure, sized so that it can withstand such constrains.

In order to avoid the tricycle to be submitted to high mechanical stresses induced by speed and to keep its weight low, the slowing down is triggered automatically when the tricycle reaches a preset speed, for instance in the range 20 km/h to 30 km/h. The generated electric energy first loads the battery and if need be is dissipated in the suited resistance 18.

This capability of reducing the maximum speed of the tricycle when going downhill, allows a significant reduction of the size of the structure that is submitted to the mechanical stresses, and hence a significant reduction of the weight of the tricycle. Indeed, the tricycle could reach a speed of 65 KM/H when going downhill and hence induce stresses very much higher than the same tricycle limited to 25 km/h, the ratio being 65 square/25 square, that is about a ratio 7.

The speed limitation is therefore the only appropriate mean to reduce significantly the material thickness and the overall mass to build an ultralight vehicle.

According to a more advanced variation of the invention, the onboard electronics includes an accelerometer that triggers the slowing down unit as a function of the quality of the road. That way, if the tricycle starts going downhill and if the accelerometer detects a high level of vibrations induced by the poor quality of the road, the electronics triggers the speed decrease that will be the sharpest when the road is the bumpiest. For instance, the maximal speed reached when going downhill on a good quality surface could be 30 km/h while the speed is reduced to 25 or even 20 km/h when the surface quality is poor.

According to another version of the invention, the front-rear maneuver of the steering wheel induces the motion of the steering shaft which is bound to the steering wheel and therefore acts on a mechanical part that, when rotating, through a reduction system induces the rotation of a cam that is not represented, that triggers the acceleration and slowing down/braking command unit, such as described above.

It has to be noted that the tricycle according to the invention includes a socket devised to be connected to the male plug of a charger hooked up on a power supply in order to load the battery at home or/and in the office.

Figure 6:
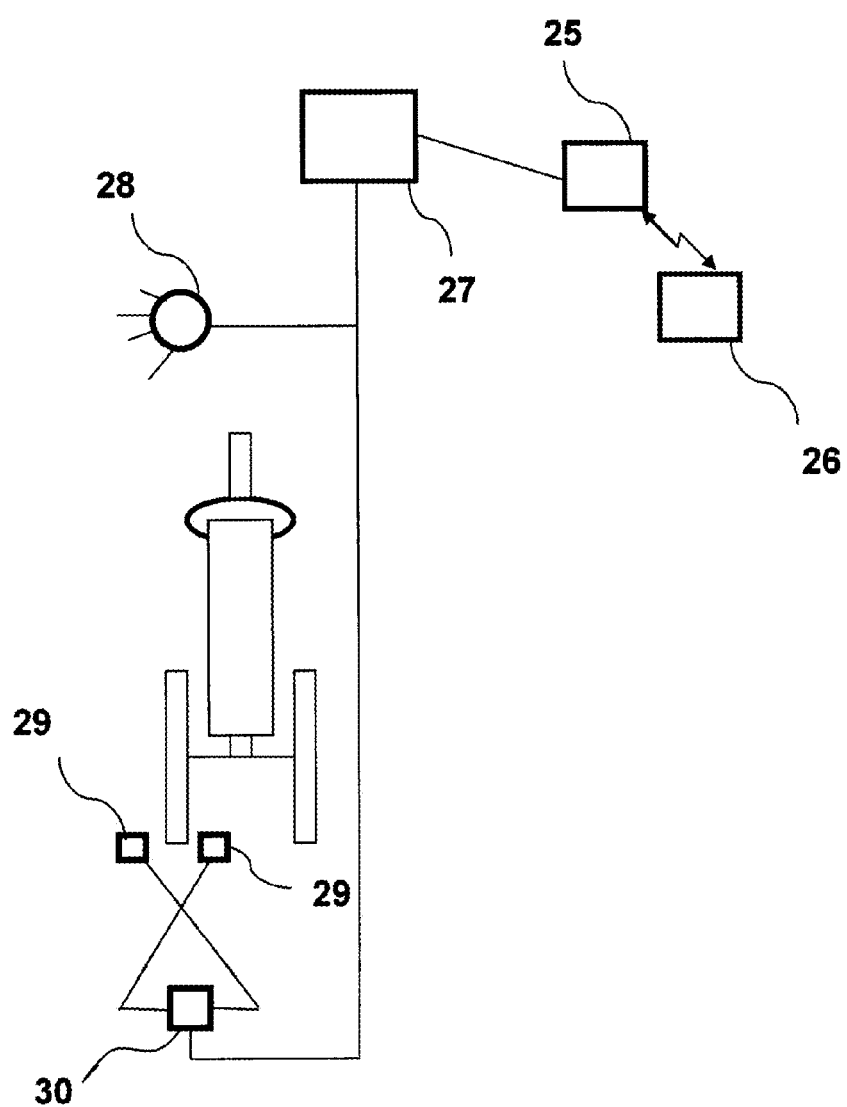
FIG. 6 is a block diagram of the reloading and guarding booth.
Figure 7:
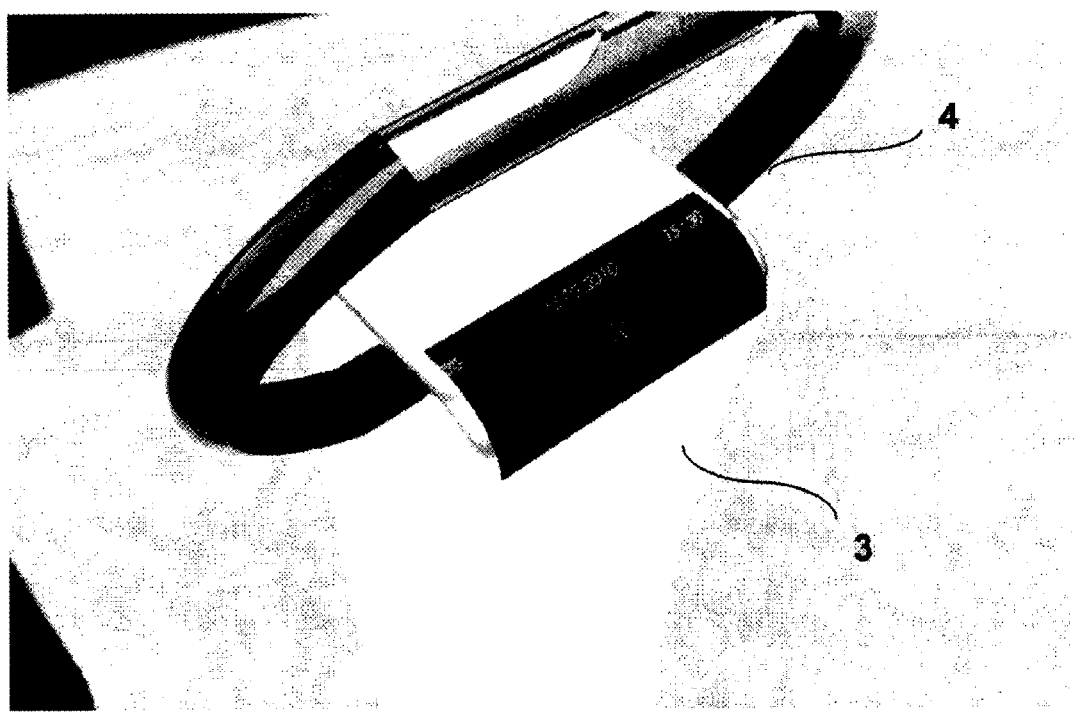
FIG. 7 represents the steering shaft, the display unit with the tachymeter and the steering wheel.

The tricycles such as the tricycle according to the invention described above are stored in a loading and guarding booth as illustrated in the block diagram of FIG. 6.

Several loading and guarding booth, combined with advertising displays, may be located around the city and may allow several tricycles to be loaded at the same time. For this function, one of the main characteristics of the invention described above, namely the capability of the tricycle to be folded and unfolded in a few seconds, is decisive since it will be possible to load simultaneously a great number of tricycles purposes of the invention, without cluttering the public space.

Each tricycle is fitted with an electronic chip storing a unique identifying code and with means that allow the remote transmission of the said code toward a loading and guarding booth.

The loading and guarding booth is equipped with electronics 27 fitted with the means to store the codes of the tricycles being loaded on the booth. The user has a private badge 26 devised for remote transmission through a RFID sensor 25 to the loading and guarding booth, the said sensor being connected with the electronics of the booth. Thus, the private badge allows the identification and unlocking of the right vehicle among others when it is on a loading and guarding booth.

The private badge may also be devised to be used as an ignition key. The tricycle then includes a RFID sensor and the user needs to bring his badge 26 close to this sensor to get the tricycle started.

The loading and guarding booth is fitted with the means that allow identifying and storing the unique identification codes of each tricycle that is present on the booth. The data transfer from the chips on the tricycles to the electronics 27 is made through known means such as RFID, radiofrequency, infrared or a signal integrated into the current, when connecting the tricycle to the loading booth.

When the user wants to take his tricycle back, he moves his badge 26 close to the RFID sensor 25 on the booth, the electronics 27, having previously stored all the known tricycles being loaded, triggers the unlocking of the identified tricycle. A light signal 28 in front of the tricycle location blinks in order to show to the user the location of his vehicle.

The locking-unlocking may be made through any known technique, for instance by clamping one of the two front wheels by two jaws 29 powered by the electromagnet 30 when the front wheels of the tricycle being parked come into the area built for that purpose.

According to a variation of the realization, the tricycle may include a set of sensors able to identify the useful pieces of information useful to the user such as speed, battery load level, covered distance, remaining distance before reloading, the said pieces of information being displayed on a tilted screen located above the steering wheel.

According to another variation, the tricycle may include a case on the steering shaft with a lid that can be opened or closed. This case may include several objects such as a foldable basket that, once unfolded, may be hooked up to the steering shaft allowing the user to carry any useful object such as a backpack and purchases.

Finally, the tricycle according to the invention being an electric vehicle, it is very quiet and thus may represent some danger. That is the reason why it is possible to fit it with a device that transmits a nice or funny piece of music such as a bird song, bell sounds, discreet tunes etc. The user will have the choice between several themes or even a random tune. The piece of music that can be heard will be encrypted through a real time encoding algorithm depending on one or several variable factors such as time, date, year, or even a combination of several variable factors and one set factor such as the unique serial number of the tricycle. This encryption is not detectable by ear, but perfectly identifiable with a device specifically designed to that effect. It may be made in many ways, for instance by superimposing to the reference sound signal, a discreet encoded additional sound of a few decibels every 50 milliseconds or by encoding the time gap between such additional sounds or by a combination of both means, the code including the serial number and the signature of the variable parameters. Such a device provides the following two advantages for the tricycle, firstly to be driven in utmost safety since it can be noticed and secondly a stolen or counterfeited tricycle may be identified right away through the identification of the encoding data and comparison with a database of the stolen tricycles.

The invention claimed is:

1. Ultralight tricycle with electric propulsion comprising
a base frame (15) fitted with two front wheels and one driving back wheel (9),
an electric engine (10) to drive said driving wheel,
a powering battery (11) to provide electric current to said electric engine and,
a driving shaft (3) extending from the base frame and including a steering wheel (4) to be maneuvered by a user to control steering and speed of the tricycle,
the tricycle being designed to switch from an unfolded configuration where said driving shaft is in a position almost perpendicular to said base frame and bound to it in order to allow the user positioned on the base frame to maneuver said steering wheel to ride the tricycle, to a folded configuration where said driving shaft is lowered toward the base frame to allow the user to seize said steering wheel to pull the tricycle rolling on its two front wheels while keeping the rear wheel away from the ground;
said tricycle further comprising
a tachymeter to measure a speed of the tricycle and
a slowing down/braking command unit (20, 20bis) connected to said tachymeter and suited to command transformation of said engine into a generator of electric current provided to said battery when the speed of said tricycle exceeds a preset speed ranging from 20 km/h to 30 km/h in order for the tricycle to slow down as a result of said engine becoming a generator and acting like a brake.

2. Tricycle according to claim 1, where said steering wheel (4) may be moved forwards or backwards by the user, the forward or backward motions of said steering wheel acting on a cam (19) bound to said steering wheel,
the forward motion acting through said cam on an acceleration command unit (12) to provide acceleration to the tricycle and
the backward motion acting through said cam on said slowing down/braking command unit (20) to slow down the tricycle by transforming said engine into an electric current generator.

3. Tricycle according to claim 2, where said slowing down/braking command unit (20) triggers braking of the tricycle after its slowing down when said steering wheel (4) is moved backward by the user from a preset position.

4. Tricycle according to claim 2, where the motion of said steering wheel (4) to the right or to the left induces rotation of the front wheels in the same direction and hence allows the tricycle to turn to the right or to the left.

5. Tricycle according to claim 1, where said folded configuration is achieved by means for freeing said driving shaft (3) from said base frame (15) so that it can be lowered toward the base frame.

6. Tricycle according to claim 1, where said base frame (15) is fitted with a case (16) protected by a lid (17) and containing a removable saddle (14) allowing the user to stay seated during motion of the tricycle.

7. Tricycle according to claim 1, further comprising an electronic chip storing a unique identification code and means for remote transmission of said code to a loading and guarding booth.

8. Tricycle according to claim 1, further comprising a set of sensors that can provide information to the user, said information being selected from the group consisting of speed, battery load level, covered distance, and distance left before re-loading, said information being displayed on a tilted screen in a bottom part of said steering wheel (4).

9. Tricycle according to claim 1, further comprising a device that can transmit music that has been encrypted though real time encoding depending on at least one variable factor selected from the group consisting of time, date, and year, or even a combination of several variable factors and one set factor, where said encoding cannot be detected by ear but is identifiable by an appropriate device, so that it is possible to immediately identify a stolen or counterfeited tricycle.

10. Tricycle according to claim 1, where said engine (10) is integrated in a hub of the driving wheel (9), thereby avoiding the use of a transmission means selected from the group consisting of a chain, a belt and a universal joint.

* * * * *